(12) United States Patent  (10) Patent No.: US 9,078,017 B2
Bennett et al.  (45) Date of Patent: Jul. 7, 2015

(54) METHOD AND DEVICE FOR BUFFERING DATA FOR MULTIPLEXING

(75) Inventors: Jeremy Bennett, Hampshire (GB); Steven Woodhead, Southampton (GB)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 13/988,856

(22) PCT Filed: Nov. 26, 2010

(86) PCT No.: PCT/EP2010/068296
§ 371 (c)(1),
(2), (4) Date: May 22, 2013

(87) PCT Pub. No.: WO2012/069088
PCT Pub. Date: May 31, 2012

(65) Prior Publication Data
US 2013/0247126 A1  Sep. 19, 2013

(51) Int. Cl.
*H04L 12/815* (2013.01)
*H04L 12/801* (2013.01)
*H04L 12/835* (2013.01)
(Continued)

(52) U.S. Cl.
CPC .......... *H04N 21/23611* (2013.01); *H04L 47/22* (2013.01); *H04L 47/2408* (2013.01); *H04L 47/29* (2013.01); *H04L 47/30* (2013.01); *H04N 21/23406* (2013.01); *H04N 21/23614* (2013.01); *H04N 21/23655* (2013.01); *H04L 65/602* (2013.01)

(58) Field of Classification Search
CPC   H04L 47/30; H04L 65/602; H04N 21/23611; H04N 21/23614; H04N 21/23655; H04N 21/23406
See application file for complete search history.

(56) References Cited

U.S. PATENT DOCUMENTS 6,665,872 B1 * 12/2003 Krishnamurthy et al. ...... 725/95
2004/0013136 A1   1/2004 Mailhot et al.
(Continued)

FOREIGN PATENT DOCUMENTS

EP   1 071 234   1/2001
EP   1 326 355   7/2003

OTHER PUBLICATIONS

International Search Report for PCT/EP2010/068296, mailed Aug. 16, 2011.

*Primary Examiner* — Jefferey Harold
*Assistant Examiner* — Sean Haiem
(74) *Attorney, Agent, or Firm* — Baker Botts, LLP

(57) ABSTRACT

The invention relates to a method and device for buffering data for multiplexing. The invention also relates to a method of multiplexing and to a multiplexer arrangement using the method and device for buffering data for multiplexing. In one embodiment the invention can be applied to the buffering of non-traffic data, such as firmware updates or other supplementary information, before multiplexing the non-traffic data with traffic data, such as television data of television channels, to form a satellite broadcast channel. In embodiments of the invention, non-traffic data for multiplexing is buffered and then read out again for multiplexing at a rate which is a function of buffer fullness. The non-traffic data may be multiplexed with at least one traffic data channel. A multiplexer can view the non-traffic data channel as another multiplexing input and can allocate the available bit rate between the traffic data channels and the non-traffic data accordingly.

16 Claims, 8 Drawing Sheets

(51) Int. Cl.
*H04L 12/851* (2013.01)
*H04L 29/06* (2006.01)
*H04N 7/173* (2011.01)
*H04N 7/16* (2011.01)
*H04J 3/24* (2006.01)
*H04N 21/236* (2011.01)
*H04N 21/234* (2011.01)
*H04N 21/2365* (2011.01)

(56) References Cited

U.S. PATENT DOCUMENTS

| | | | |
|---|---|---|---|
| 2008/0198876 A1* | 8/2008 | Stranger et al. | 370/474 |
| 2009/0138966 A1* | 5/2009 | Krause et al. | 726/21 |
| 2011/0176562 A1* | 7/2011 | Wang | 370/538 |
| 2012/0005716 A1* | 1/2012 | Milne et al. | 725/148 |

* cited by examiner ns, to form a satellite broadcast channel.
METHOD AND DEVICE FOR BUFFERING DATA FOR MULTIPLEXING This application is the U.S. national phase of International Application No. PCT/EP2010/068296 filed 26 Nov. 2010 which designated the U.S., the entire content of which is hereby incorporated by reference.

TECHNICAL FIELD

The invention relates to a method and device for buffering data for multiplexing. The invention also relates to a method of multiplexing and to a multiplexer arrangement using the method and device for buffering data for multiplexing. In one embodiment the invention can be applied to the buffering of non-traffic data, such as firmware updates or other supplementary information, before multiplexing the non-traffic data with traffic data, such as television data of television channels, to form a satellite broadcast channel.

BACKGROUND

There are a number of situations where a number of separate channels are combined or multiplexed into a single combined channel. One example of such a situation is in many digital television broadcast systems around the world where the total bit rate of the broadcast channel containing the compressed digital channels is fixed but this value is sufficiently large to allow multiple television channels to be included in the total bit rate. In a satellite direct-to-home system the bit rate of the broadcast channel is defined by the satellite transponder (typically 36 Mbit/s).

The number of bits required to compress many signals varies depending on the complexity of the original signal and the compression scheme used, but typically the compressed bit rate produced from the original signal will not be constant but instead will vary. In order to improve the efficiency of the multiplexing system, the television channels are not coded with a fixed bit rate but rather with a fixed quality where the sum of the instantaneous bit rate of the channels is equal to the fixed total. This is called Statistical Multiplexing or StatMux for short as it is assumed that the channels are statistically independent so when one channel needs more bits to achieve the quality, another will require less. The efficacy of the operation is evaluated on maximising the quality across the channels. The efficacy can be improved by two main methods: encoding efficiency for a single channel; and ensuring that the sum of the instantaneous bit rate does not fall below the fixed total for any period of time.

Increasingly it is desired to be able to transmit additional data together with the multiplexed channels. In the example of the digital satellite system, this additional data might include firmware upgrades for set top boxes (STB), or video-on-demand data that is being trickle-fed to the set top boxes or training course material to be sent to remote sites, or any other data.

This operation represents extra revenue for the broadcaster and is therefore desirable. However, a sizeable part of the broadcast channel may be used for this additional data, so it may have an impact on the quality of the compression coded channels. Previously, a portion of the bit rate of the combined channel is reserved for the additional data. However, typically the bit rate for the data varies significantly over time, and the total bit rate for the broadcast channel will not be fully utilised because of the fixed overhead for the additional data.

The invention seeks to minimise or obviate at least some of the disadvantages of the prior art.

SUMMARY

In accordance with a first aspect of the invention there is provided a method for buffering of non-traffic data for a multiplexer arranged for multiplexing the non-traffic data with at least one traffic data channel. In a first step received non-traffic data is stored in a buffer. In a second step a desired playout rate for non-traffic data in the buffer is determined as a function of buffer fullness. In a third step non-traffic data is read out of the buffer at a determined playout rate for multiplexing with the at least one traffic data channel.

In accordance with a second aspect of the invention there is provided a method of multiplexing non-traffic data with at least one traffic data channel using the method for buffering of non-traffic data in accordance with embodiments of the invention. In a first step of the method of multiplexing, a rate request for traffic data in one or more traffic data channel is received. In a second step an available bit rate is allocated to traffic data in the or each traffic data channel and a determined playout rate to the non-traffic data channel based on the received rate requests and the desired playout rate. In a third step, the non-traffic data read out from the buffer is multiplexed with the traffic data from one or more traffic data channels according to the bit rate allocation.

In accordance with a third aspect of the invention, there is provided a device for buffering of non-traffic data, for a multiplexer arranged for multiplexing the non-traffic data with traffic data in one or more traffic channels. The device comprises a buffer for receiving and storing the non-traffic data, the buffer being coupled for supplying the stored non-traffic data for multiplexing with the at least one traffic data channel. The device also comprises a demand unit for determining a desired playout rate for non-traffic data in the buffer as a function of buffer fullness and for causing non-traffic data to be read out at a determined playout rate for multiplexing with the at least one traffic data channel.

In accordance with a fourth aspect of the invention there is provided a multiplexer arrangement for multiplexing non-traffic data with traffic data in one or more traffic channels. The multiplexer arrangement has a device for buffering of non-traffic data in accordance with embodiments of the invention. The multiplexer arrangement also has a multiplex controller operable to receive rate requests for traffic data in one or more traffic data channels; and coupled to the demand unit and operable to receive from the demand unit a desired playout rate for the non-traffic data. The multiplex controller is operable to allocate an available bit rate to the or each traffic data channel and to the non-traffic data based on the received rate requests and the desired playout rate received from the demand unit; and to multiplex the non-traffic data read out from the buffer at the predetermined playout rate with the traffic data from one or more traffic data channels according to the bit rate allocation.

BRIEF DESCRIPTION OF THE DRAWINGS

The invention will now be described by way of example with reference to the accompanying drawings.

DETAILED DESCRIPTION

The invention relates to a device and method for buffering of non-traffic data for a multiplexer and to a multiplexer and method of multiplexing non-traffic data and traffic data of at least one traffic data channel. In some embodiments the invention may be applied to the multiplexing of non-television data with compression encoded television channels.

In this specification the term "traffic data" is intended to refer to the data in the data channels being multiplexed. This data is generally continuous, although the bit rate required for each channel is not constant. In the exemplary embodiment the traffic data is compression encoded audio and/or video data, for example for a television channel. The term "non-traffic data" is intended to refer to data that is to be added to the multiplexed output when available. The non-traffic data is not necessarily continuously available, but is multiplexed with the traffic data when it is available. In the exemplary embodiment the non-traffic data are firmware updates to remote devices.

In order to better understand the invention, a prior art multiplexing arrangement will now be discussed with reference to FIGS. 1 and 2.

Figure 1:
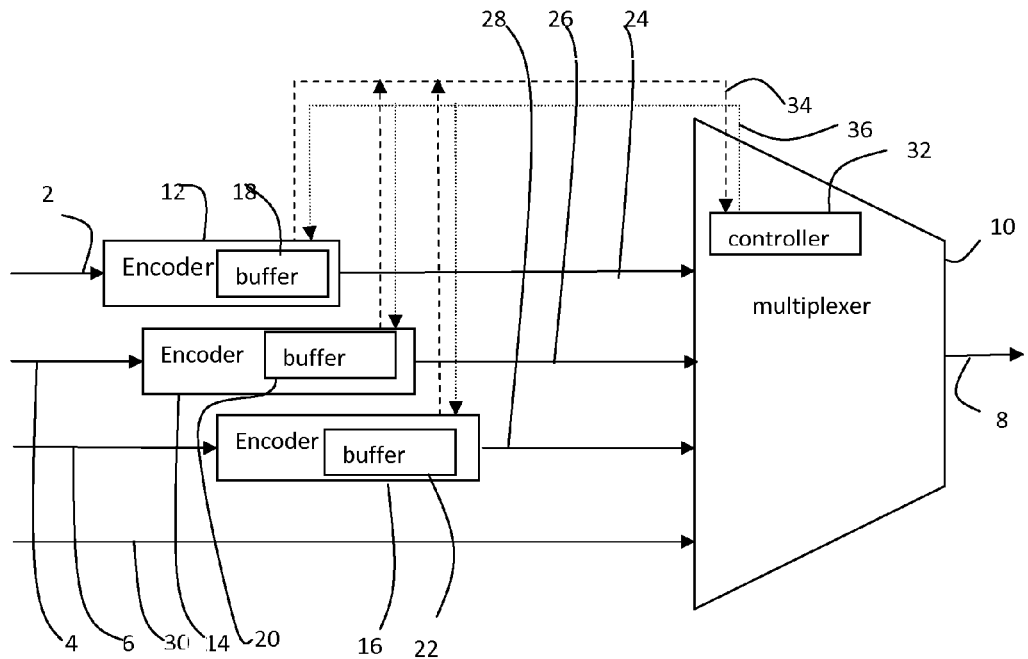
FIG. 1 is a block diagram of a prior art multiplexing arrangement.
Figure 2:
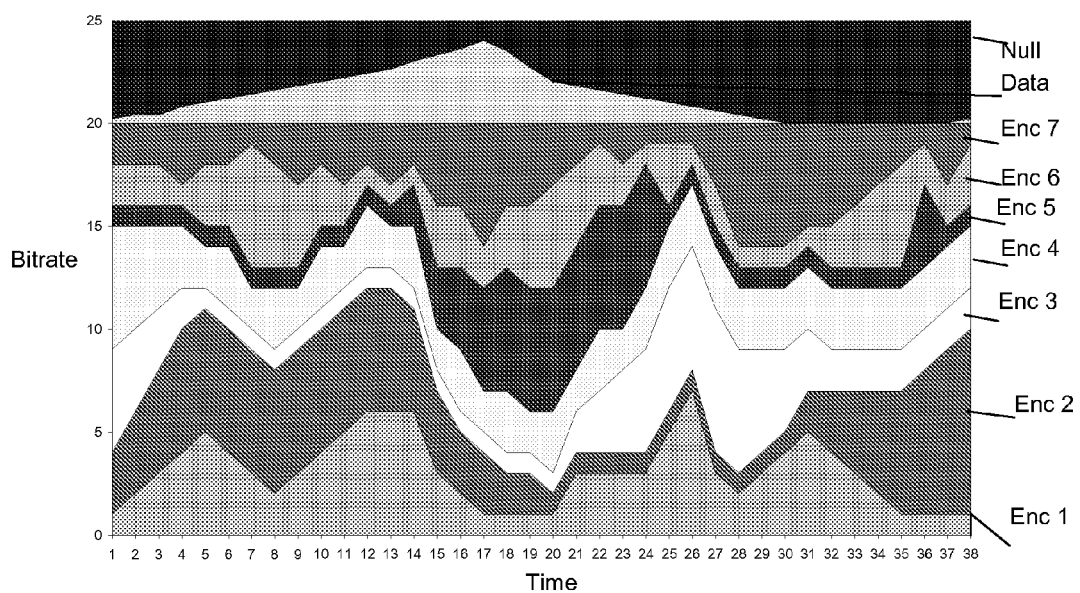
FIG. 2 shows an exemplary bit rate allocation over time made by a multiplexer controller in a statistical multiplexing system.

FIG. 1 is a block diagram of a prior art multiplexing arrangement for multiplexing three traffic data signals 2, 4, 6 together to form a single multiplexed signal 8. The traffic data signals 2, 4, 6 might typically be television signals.

The input traffic data signals 2, 4, 6 are coupled to respective encoders 12, 14, 16 that are arranged to compression encode the traffic data signals 2, 4, 6. The encoders 12, 14, 16 are provided with respective output buffers 18, 20, 22 for storing the compression coded traffic data signals produced by the respective encoders 12, 14, 16.

The encoders 12, 14, 16 are coupled to the multiplexer 10 in order to supply the compression coded traffic data signals 24, 26, 28 stored in respective output buffers 18, 20, 22 to the multiplexer 10.

In addition, as previously discussed, non-traffic data 30 is also supplied to the multiplexer 10 to be multiplexed with the three traffic signals 2, 4, 6. The non-traffic data might represent firmware updates to user equipment or any kind of supplementary data.

The multiplexer 10 is provided with a multiplexer controller 32 for controlling the operation of the multiplexer 10. In a statistical multiplexer 10, the multiplexer controller 32 is coupled to the encoders 12, 14, 16 in order to receive respective bit rate requests 34 from the encoders 12, 14, 16, and to provide the encoders 12, 14, 16 with respective bit rate allocations 36.

The operation of the multiplexer 10 shown in FIG. 1 will now be explained. As will be known by a skilled person, in a first stage, for each successive time period the multiplexer controller 32 receives bit rate requests 34 from each of the encoders 12, 14, 16. The respective bit rate requests 34 from the encoders 12, 14, 16 represent the amount of data during the time period that the encoder needs to encode the respective input traffic data signal 2, 4, 6 at particular quality level.

The multiplexer 10 has a fixed output bit rate, and this corresponds to a number of bits that can be transmitted within each successive time period. The multiplexer controller 32 reserves some of the available output bits for the non-traffic data 30 and allocates the remaining available output bits to the encoders 12, 14, 16 in accordance with the bit rate requests 34 received from the encoders, as will be known to a skilled person. As will be known to a skilled person, if the total number of bits requested exceeds the number of available bits in the time period, the multiplex controller 32 allocates fewer bits to each of the encoders than the number of bits requested by the respective encoder, thus resulting in a reduced level of compression coding quality being applied to all of the traffic data signals 2, 4, 6 in that time period. The multiplex controller 32 informs the encoders 12, 14, 16 of their respective bit rate allocation using the bit rate allocation signal 36.

Thereafter, the encoders 12, 14, 16 compression code the input traffic data signals 2, 4, 6 in respect of the relevant time period and store the resulting compression coded traffic data 24, 26, 28 in the respective buffers 18, 20, 22.

The multiplexer 10 takes the non-traffic data 30 and the compression coded traffic data 24, 26, 28 and multiplexes them typically by interleaving them and outputting the multiplexed data 8. The operation of the multiplexer 10 will be familiar to a skilled person and so will not be described in more detail.

These principles of this multiplexer operation will now be illustrated with reference to FIG. 2. FIG. 2 shows an exemplary bit rate allocation over time made by a multiplexer controller in a statistical multiplexing system, operating as described above in connection with FIG. 1. In the multiplexing system for FIG. 2, the multiplexer has an input connection to an array of seven encoders (Enc 1, Enc 2, Enc 3, Enc 4, Enc 5, Enc 6 and Enc 7) and to a non-traffic data connection (data). The example bit rates are included in the diagram.

The output bit rate for this exemplary system is 25 Mbit/s and of this output data rate 5 Mbits/s are reserved for the non-traffic data and 20 Mbits/s are allocated to the encoders. As can be seen from a careful consideration of FIG. 2, while the bit rate of 20 Mbits/s for the encoders is fully utilised, there is still null data present in the total 25 Mbit/s transmission in time periods when the required data rate for the non-traffic data is less than 5 Mbit/s.

For example, at time 31, the allocated bit rates are:
Enc 1=5 Mbit/s
Enc 2=2 Mbit/s
Enc 3=3 Mbit/s
Enc 4=3 Mbit/s
Enc 5=1 Mbit/s Enc 6=1 Mbit/s
Enc 7=5 Mbit/s
Data=0 Mbit/s
Wasted=5 Mbit/s Exemplary embodiments of the invention will now be described with reference to FIGS. 3-12.

Figure 3:
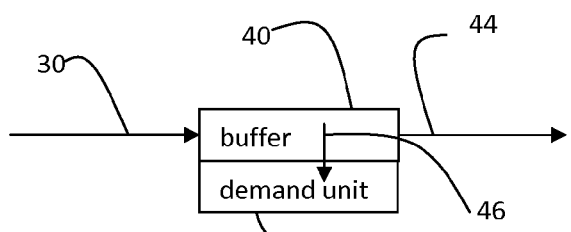
FIG. 3 shows a device in accordance with embodiments of the invention.

FIG. 3 shows a device in accordance with embodiments of the invention. Typically embodiments may be used for multiplexing supplementary non-television data with television data of a plurality of television channels.

In FIG. 3 a buffer 40 is provided and is coupled to receive the non-traffic data 30 and to buffer it prior to multiplexing with traffic data of at least one traffic data channel. In use the buffer 40 is arranged to supply non-traffic data 44 read out from the buffer for multiplexing with the traffic data.

The buffer 40 is coupled with a demand unit 42. In embodiments of the invention the demand unit 42 determines a desired playout rate for the non-traffic data from the buffer 40 as a function of the buffer fullness, i.e. the amount of data being stored in the buffer 40, as will be explained more fully in the following description.

In some embodiments, the demand unit 42 is arranged to determine the fullness of the buffer 40, for example by means of a buffer fullness measure 46 supplied from the buffer 40 to the demand unit 42. In other embodiments the demand unit determines the buffer fullness in other ways, for example in one embodiment by monitoring the length of time that a specific piece of data has spent in the buffer before being read out.

In some embodiments the demand unit 42 may be coupled to a multiplexer controller of a multiplexer and arranged to communicate the desired playout rate for the non-traffic data 30 to the multiplexer controller. In some embodiments, as will be explained in more detail with reference to the following drawings, the demand unit 42 may be arranged to receive from the multiplexer controller a determined playout rate for the buffered non-traffic data 30.

In some embodiments the buffer 40 or the demand unit 42 may be arranged to supply a buffer overflow signal to inform the multiplexer controller of a buffer overflow, as will be explained in more detail below.

Figure 4:
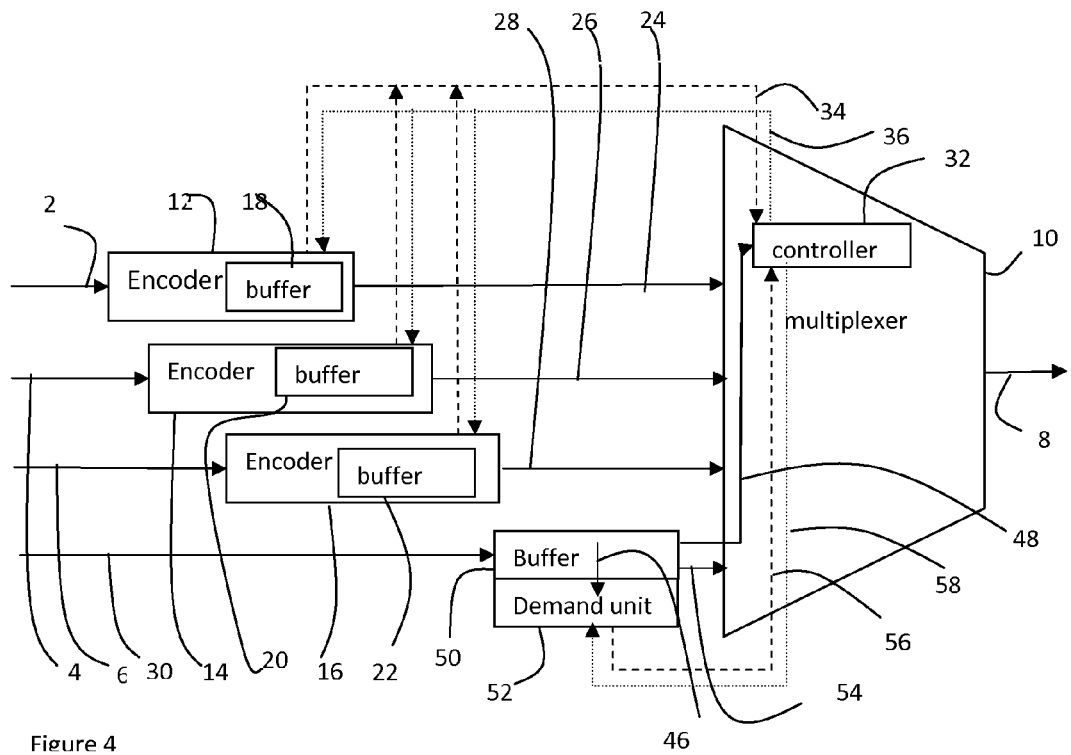
FIG. 4 shows a first exemplary embodiment of a device in a multiplexing arrangement.
Figure 5:
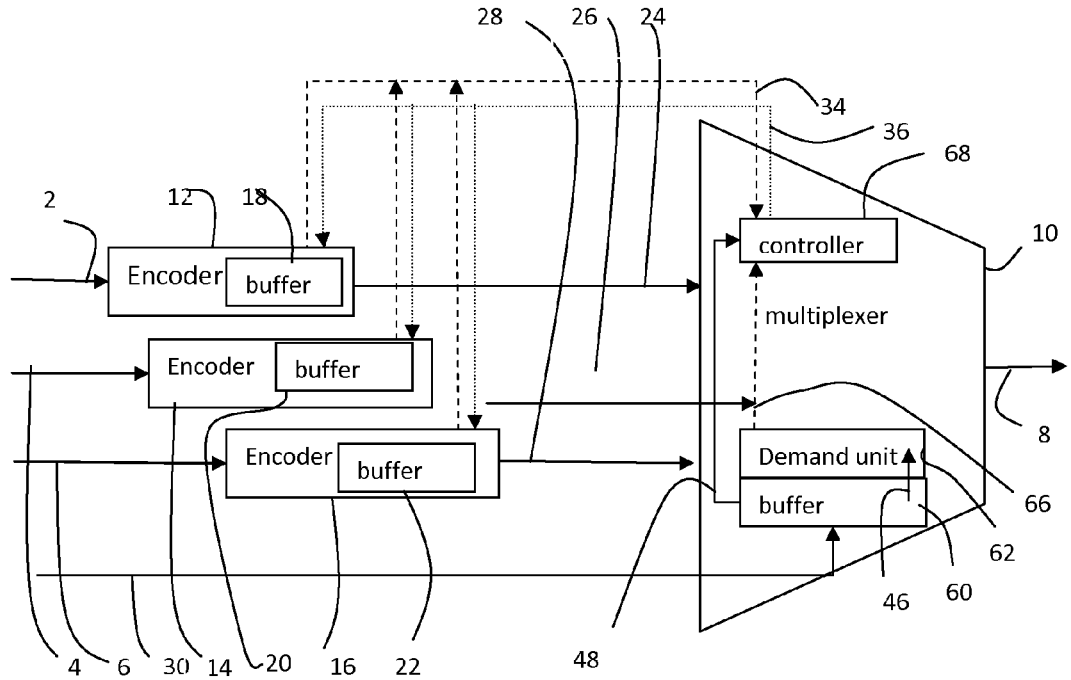
FIG. 5 shows a second exemplary embodiment of a device in a multiplexing arrangement.

A first exemplary embodiment will be described with reference to FIG. 4, and a second exemplary embodiment will be described with reference to FIG. 5. In FIGS. 4 and 5 the same multiplexing arrangement of a multiplexer 10 and encoders 12, 14, and 16 as shown in FIG. 1 is used to illustrate the different arrangements in which embodiments of the invention may be deployed. However, it will be appreciated by a skilled person that the principles described herein may be applied to many multiplexing situations, and that the invention is not limited to the particulars of the exemplary embodiment.

The same reference numbers are used in FIGS. 4 and 5 for the same or similar features as described above with reference to FIG. 1, and it will be understood by a skilled person that the operation of the multiplexing arrangement in FIGS. 4 and 5 correspond with the operation of the multiplexing arrangements described above with reference to FIG. 1 except where indicated below.

In the embodiment shown in FIG. 4 a buffer 50 for the non-traffic data 30 and a corresponding demand unit 52 are provided externally to the multiplexer 10 having a multiplexer controller 32. Buffer 50 and demand unit 52 correspond to the buffer 40 and demand unit 42 described above with reference to FIG. 3. This embodiment may be used as an implementation in an existing multiplexer arrangement, for example as an upgrade to the multiplexer 10.

FIG. 4 shows the buffer 50 is coupled to receive the non-traffic data input 30, and the output of the buffer 50 is coupled to an input of the multiplexer to supply non-traffic data at the playout rate 54 to the multiplexer 10. The demand unit 52 is arranged to receive a buffer fullness measure 46 from the buffer 50. In the embodiment shown in FIG. 4, the demand unit 52 is coupled to the multiplexer controller 32 to provide the multiplexer controller 32 with a bit rate request 56, and to receive a bit rate allocation 58 from the multiplexer controller 32. The demand unit 52 then controls the buffer 50 so that the non-traffic data at the determined playout rate is supplied from the buffer 50 to the multiplexer 10, as will be explained in more detail below. In the event of a buffer overflow situation, as will be explained in more detail below, a buffer overflow signal 48 can be sent by the buffer 40 to the multiplex controller.

In the embodiment shown in FIG. 5 a buffer 60 for the non-traffic data 30 and a corresponding demand unit 62 are provided internally in the multiplexer 10 having a multiplexer controller 68. Buffer 60 and demand unit 62 correspond to the buffer 40 and demand unit 42 described above with reference to FIG. 3. This embodiment may be used as an implementation in a new multiplexer arrangement, for example.

FIG. 5 shows the buffer 60 coupled to receive the non-traffic data input 30. The non-traffic data may be read out of the buffer 60 under the control of the demand unit 62 during the multiplexing operation. The demand unit 62 is arranged to receive a buffer fullness measure 46 from the buffer 60. In the embodiment shown in FIG. 5, the demand unit 62 is coupled to the multiplexer controller 68 to provide the multiplexer controller 68 with a bit rate request 66. However, in this exemplary embodiment the demand unit 62 does not receive bit rate allocation from the multiplexer controller 68. The demand unit 62 controls the buffer 60 so that the non-traffic data in the buffer 60 is supplied for multiplexing at the rate corresponding to the requested rate, as will be understood more clearly from a consideration of the following description. In the event of a buffer overflow situation, as will be explained in more detail below, a buffer overflow signal 48 can be sent by the buffer 40 to the multiplex controller.

The method of operation of the device in accordance with embodiments of the invention will now be described with reference to FIGS. 6-9, and corresponding multiplexing methods are described with reference to FIGS. 10 and 11.

Figure 6:
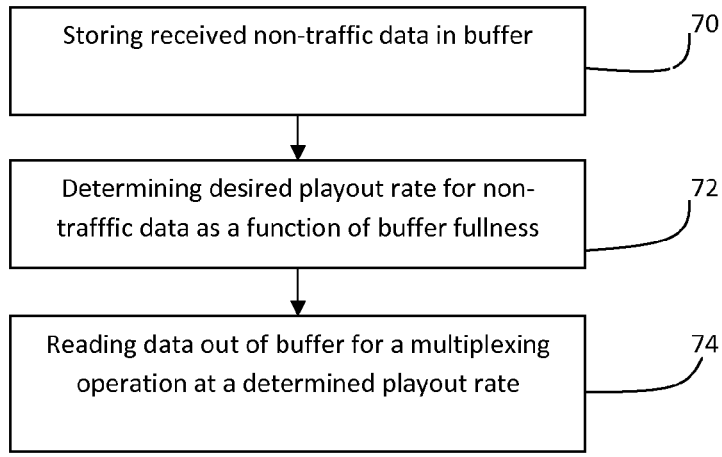
FIG. 6 shows an exemplary method of operation of a device in accordance with embodiments of the invention.

An exemplary method of operation of a device in accordance with embodiments of the invention is described in FIG. 6.

In step 70 of the exemplary method shown in FIG. 6, the received non-traffic data 30 is stored in a buffer 40, 50, 60.

In step 72 of the exemplary method shown in FIG. 6, a desired playout rate for the non-traffic data is determined as a function of the fullness of the buffer. In the exemplary devices shown in FIG. 3-5, the desired playout rate for the non-traffic data is determined by the demand unit 42, 52, 62 based on the fullness of the buffer 40, 50, 60. An exemplary method of determining a desired playout rate for the non-traffic data as a function of buffer fullness will be described below with reference to FIGS. 7 and 8.

In step 74 of the exemplary method shown in FIG. 6, the non-traffic data is read out of the buffer for a multiplexing operation at a determined playout rate. As will be seen after consideration of the following description, in some embodiments the determined playout rate may be the desired playout rate determined in step 74, or in some embodiments the determined playout rate may be a playout rate determined for the non-traffic data by a multiplexing controller during a multiplexing operation and communicated to the demand unit 42, 52, 62 by the multiplexing controller.

Figure 7:
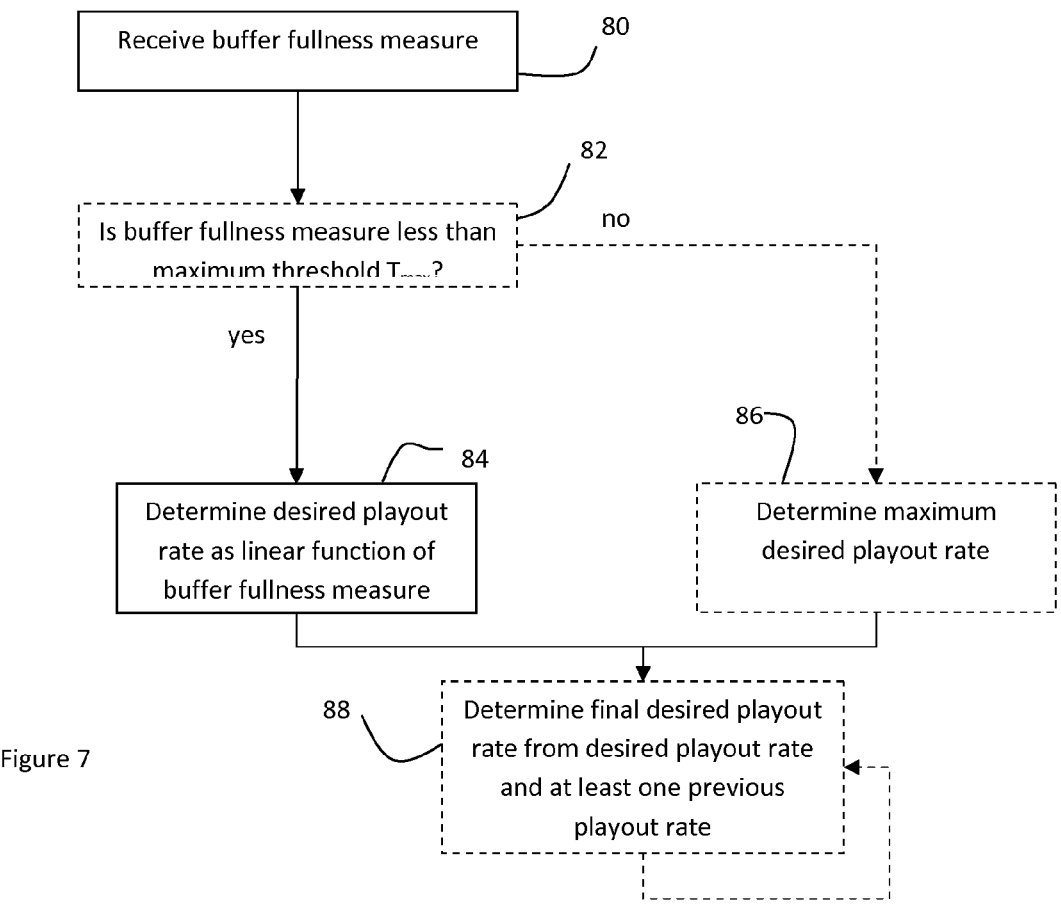
FIG. 7 shows an exemplary method for determining a desired playout rate.

FIG. 7 shows an exemplary method for determining a desired playout rate, which is carried out by a demand unit 42, 52, 62 as step 72 of FIG. 6 described above in exemplary embodiments of the invention.

In step 80 of the exemplary method shown in FIG. 7, the demand unit 42, 52, 62 receives a buffer fullness measure 46 from the buffer 40, 50, 60. The buffer fullness is the ratio of the amount of data in the buffer to the total buffer size, and therefore the buffer fullness measure has a value in the range 0.0 to 1.0.

In the exemplary embodiment, a maximum threshold condition is applied to the buffer fullness measure, such that once a maximum threshold $T_{max}$ of the buffer fullness measure 46 is reached, further increases in buffer fullness do not result in an increase in the desired playout rate determined by the demand unit 40, 50, 60.

The application of a maximum threshold allows the maximum playout rate of the non-traffic data to be limited, which can help ensure that sufficient data rate is always available for the traffic data streams during the multiplexing operation. However, limiting the maximum playout rate of the non-traffic data may result in overflow of the buffer 40, 50, 60 if the input data rate of the traffic data is sufficiently high. Therefore in such embodiments, a buffer overflow signal 48 may be provided to inform the multiplexer controller of an overflow condition of the buffer 40, 50, 60.

Since not all embodiments apply a maximum threshold, steps 82 and 86 are not needed in all embodiments and have therefore been shown with dashed lines.

In step 82 of the exemplary method shown in FIG. 7, the demand unit 42, 52, 62 determines whether the buffer fullness measure 46 is less than a maximum threshold.

If the buffer fullness measure 46 is less than a maximum threshold, the demand unit 42, 52, 62 determines a desired playout rate as a linear function of the buffer fullness measure 46 in step 84 of the exemplary method shown in FIG. 7.

The output bit rate may be a linear function of the buffer fullness so that the latency through the data buffer 40, 50, 60 is approximately constant to minimise the buffer requirements in the decoder. This can be expressed as:

$$\text{Time\_in\_buffer} = const \times \frac{\text{buffer\_size}}{\text{bitrate}}$$

Therefore:

$$\text{bitrate} = \left(\frac{const}{\text{time\_in\_buffer}}\right) \times \text{buffer\_size}$$

As time_in_buffer is a constant, then the bit rate is a linear function of buffer_size. Different values for the constant in the above equation will affect primarily the amount of time the non-traffic data is stored in the buffer. A skilled person will be able to select a suitable value depending on the requirements of a particular embodiment.

In other embodiments, a different function of buffer fullness measure may be used to determine a desired playout rate.

If the buffer fullness measure 46 greater than or equal to the maximum threshold, the demand unit 42, 52, 62 determines a desired playout rate as a maximum desired playout rate in step 86 of the exemplary method shown in FIG. 7.

As the buffer_size reduces, the bit rate will reduce so increasing the time_in_buffer. Therefore it is recommended that some hysteresis is introduced into the bit rate calculation. In some embodiments hysteresis may be applied to the desired playout rates to improve the stability of the value time_in_buffer and to minimise short-term fluctuations in the bit rate. Thus previously calculated desired and/or determined playout rates are also used by the demand unit 42, 52, 62 in a step 88 to determine a final desired playout rate in the exemplary method shown in FIG. 7. Again, as this step may not be used in all embodiments, step 88 has been shown in dashed lines.

Figure 8:
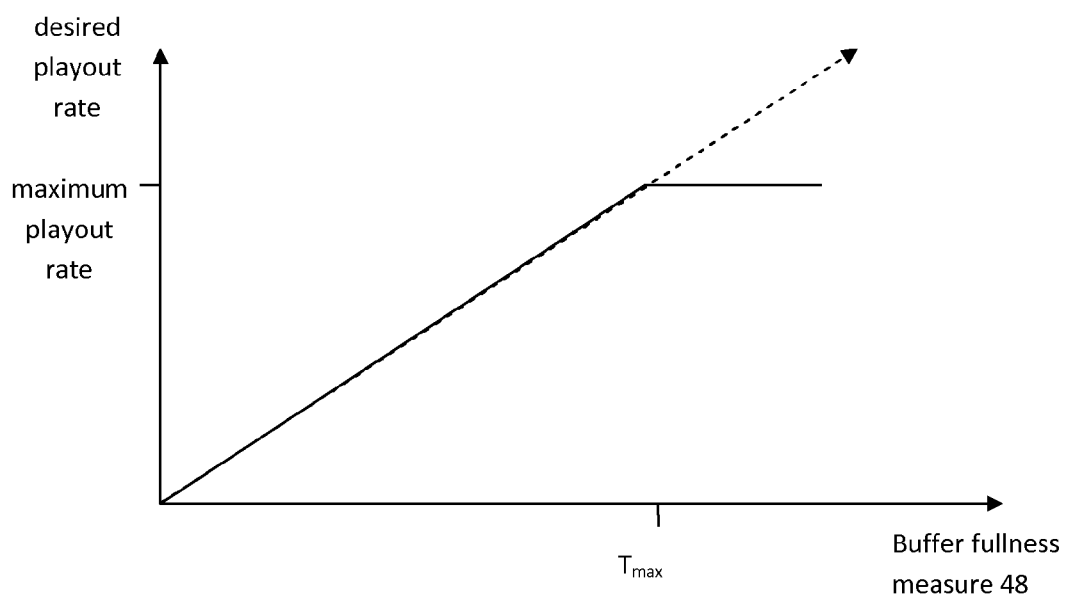
FIG. 8 is a graph showing a relationship between buffer fullness and playout rate in an exemplary embodiment.

The determination of the desired playout rate for the non-traffic data by the demand unit 42 is shown visually in FIG. 8, which is a graph showing a relationship between buffer fullness and playout rate in an exemplary embodiment where the desired playout rate has a maximum playout rate which is determined as the desired playout rate for all values of the buffer fullness measure 48 above a maximum threshold $T_{max}$.

In some embodiments it may be sufficient merely to playout the non-traffic data from the buffer 40, 60, 80 at the desired rate, since a smaller bit rate can be allocated to the non-traffic data based on a defined maximum playout rate. However, in the exemplary embodiments shown in FIGS. 4 and 5 the multiplexer controller takes into account the desired playout rate of the non-traffic data when allocating the bit rate of the multiplexer between the traffic data streams and the non-traffic data stream.

Thus in some embodiments the demand unit 42, 52, 62 is coupled to a multiplexer controller of a multiplexer and arranged to communicate the desired playout rate for the non-traffic data 30 to the multiplexer controller. In these embodiments, the demand unit 42, 52, 62 can be considered to emulate a compression encoder and can use the same communications protocols as a compression encoder to communicate rate requests to, and if necessary to receive rate allocations, from the multiplexer controller.

Figure 9:
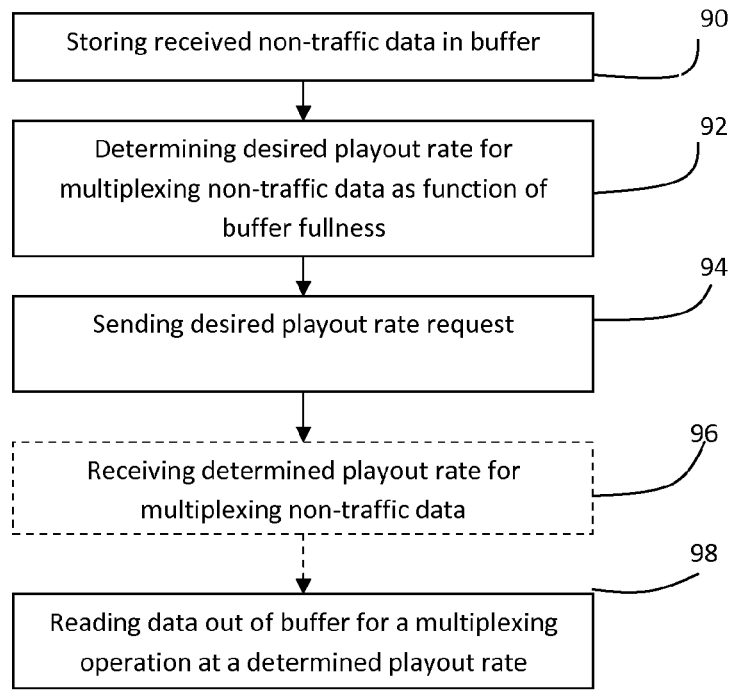
FIG. 9 shows a further exemplary method of operation of a device in accordance with embodiments of the invention.

In a first step 90 of the exemplary method shown in FIG. 9, which corresponds with step 70 of the exemplary method shown in FIG. 6, the received non-traffic data 30 is stored in a buffer 40, 50, 60.

In a second step 92 of the exemplary method shown in FIG. 9, which corresponds with step 72 of the exemplary method shown in FIG. 6, a desired playout rate for the non-traffic data is determined as a function of the fullness of the buffer. In the exemplary devices shown in FIG. 3-5, the desired playout rate for the non-traffic data is determined by the demand unit 42, 52, 62 based on the fullness of the buffer 40, 50, 60. An exemplary method of determining a desired playout rate for the non-traffic data as a function of buffer fullness has been described with reference to FIGS. 7 and 8.

In a third step 94 of the exemplary method shown in FIG. 9, the desired playout rate request determined in step 92 is sent to a multiplexer controller, so that the desired playout rate for the non-traffic data can be taken into account by the multiplexer when allocating the rates for the encoders, as will be described with reference to FIGS. 10 and 11. In the exemplary embodiments shown with reference to FIGS. 4 and 5, the demand unit 42, 52, 62 is coupled to the multiplexer controller 32, 68 to send rate requests 56, 66 to the multiplex controller 32, 68.

In some embodiments the desired playout rate request is treated by the multiplexer as simply another rate request, as if from another compression encoder, and the multiplexer controller allocates the total bit rate according to the rate requests received. The corresponding method of operation of the multiplexer controller will be described later with reference to FIG. 10. This embodiment is shown and described with reference to the arrangement shown in FIG. 4 in which the buffer 50 and demand unit 52 are external to the multiplexer, but it can also clearly applied to other arrangements such as the arrangement shown in FIG. 5 in which the buffer and demand unit are internal the multiplexer.

In the embodiment shown in FIG. 4 it will be clear to a skilled person that the multiplexer 32 operation is unchanged, and in step 96 the demand unit 52 will receive a determined playout rate 58 for multiplexing the non-traffic data. This may be the same as the desired playout rate sent to the multiplexer controller in step 94 of FIG. 9, but may be less if the sum of the bit rates required by the encoders is more than the output bit rate of the multiplexer or may be more if the sum of the bit rates required by the encoders is less than the output bit rate of the multiplexer, as will be clear to a skilled person.

In other embodiments, the multiplexer is arranged to allocate the bit rate to the non-traffic data in accordance with the desired playout rate request. The corresponding method of operation of the multiplexer controller will be described later with reference to FIG. 11. This embodiment is shown and described with reference to the arrangement shown in FIG. 5 in which the buffer and demand unit are internal to the multiplexer, but it can also clearly applied to other arrangements such as the arrangement shown in FIG. 4 in which the buffer and demand unit are external to the multiplexer.

In the embodiment shown in FIG. 5, the multiplexer controller 68 operation is changed because although the non-traffic rate request must be taken into account during the allocation of data rates to the traffic data, the multiplexer controller 68 does not need to send back the determined playout rate and therefore step 96 is omitted in this embodiment.

In a final step 98 of the exemplary method as shown in FIG. 9, which corresponds with step 74 of the exemplary method shown in FIG. 6, the non-traffic data is read out of the buffer for a multiplexing operation at a determined playout rate. As will be understood by a skilled person, in some cases the determined playout rate may be the desired playout rate determined in step 92, or it may be a playout rate determined by a multiplexing controller for a multiplexing operation that has been received in a step 96.

The method of operation of the multiplexer controller 32 as illustrated in the embodiment shown in FIG. 4, will now be described with reference to FIG. 10

As mentioned above, the multiplexer controller 32 in this arrangement does not treat the request for a desired playout rate for the non-traffic data any differently from the request for a desired rate to encode the traffic data.

Thus in step 100 of the exemplary method the multiplexer controller 32 receives rate requests for traffic data in one or more traffic channels. Typically the multiplexer 32 may receive rate requests from one or more encoders.

In step 102 of the exemplary method the multiplexer controller 32 receives a desired playout rate for the buffered non-traffic data. This may be the desired playout rate sent to the multiplexing controller in step 94 described above.

In step 104, the multiplexer controller allocates the total available output bit rate to the traffic data in one or more traffic channels and to the non-traffic data in accordance with the rate requests received in steps 100 and 102.

In step 106, the multiplexer controller sends the rate allocations made in step 104 for the traffic data streams and for the non-traffic data to the encoders and to the demand unit 42, 52 respectively.

In step 108, the multiplexer controller multiplexes buffered non-traffic data with the traffic data from one or more traffic data encoders according to the bit rate allocations made in step 104.

The multiplexer operation to multiplex the traffic data and the non-traffic data in accordance with the rate allocations will be known to a skilled person and therefore will not be described in great detail.

In embodiments therefore the multiplexer controller 32 can take the desired playout rate of the non-traffic data into account in order to allocate the available bit rate between the non-traffic data and the different encoders. This has the result that all the available bit rate is used in each time slot.

The method of operation of the multiplexer controller 68 as illustrated in the embodiment shown in FIG. 5, will now be described with reference to FIG. 11

As mentioned above, the multiplexer controller 68 in this arrangement always allocates the whole desired playout rate to the non-traffic data and then allocates the remaining bit rate between the encoders of the traffic data streams. As will be appreciated by a skilled person, in this embodiment, it is not necessary to send a rate allocation to the demand unit 42, 62 because the demand unit 42, 62 may assume that the requested desired playout rate will be allocated.

Thus in step 110 of the exemplary method the multiplexer controller 68 receives rate requests for traffic data in one or more traffic channels, for example from one or more traffic data encoders.

In step 112 of the exemplary method the multiplexer controller 68 receives a desired playout rate for the buffered non-traffic data.

In step 114, the multiplexer controller 68 allocates the desired playout rate to the buffered non-traffic data.

In step 116 the multiplexer controller 68 allocates the remaining available output bit rate to the encoders.

In step 118, the multiplexer controller 68 sends the rate allocations made in step 116 for the traffic data in the traffic channels to the respective encoders.

In step 120, the multiplexer controller 68 multiplexes buffered non-traffic data with the traffic data from one or more traffic data channels according to the desired playout rate and the bit rate allocations made in step 116.

The multiplexer operation to multiplex the traffic data and the non-traffic data in accordance with the rate allocations will be known to a skilled person and therefore will not be described in great detail.

In this arrangement the multiplexer controller 68 can take the desired playout rate of the non-traffic data into account in order to allocate the available bit rate between the non-traffic data and the different encoders. This has the result that all the available bit rate is used in each time slot.

In this exemplary embodiment, the requested bit rate for the non-traffic data is allocated in its entirety, and the multiplexer controller 68 allocates the remaining bit rate amongst the encoders. In this embodiment the demand unit 42 can treat the calculated desired playout rate as the actual rate determined for playout, and the non-traffic data may be read out of the buffer 44 at a predetermined rate of the calculated desired rate. In this case, in some embodiments the desired playout rate calculated by the demand unit 42 may be limited to a maximum value, so as to ensure that the encoders always have sufficient bit rate allocated to maintain quality.

Figure 12:
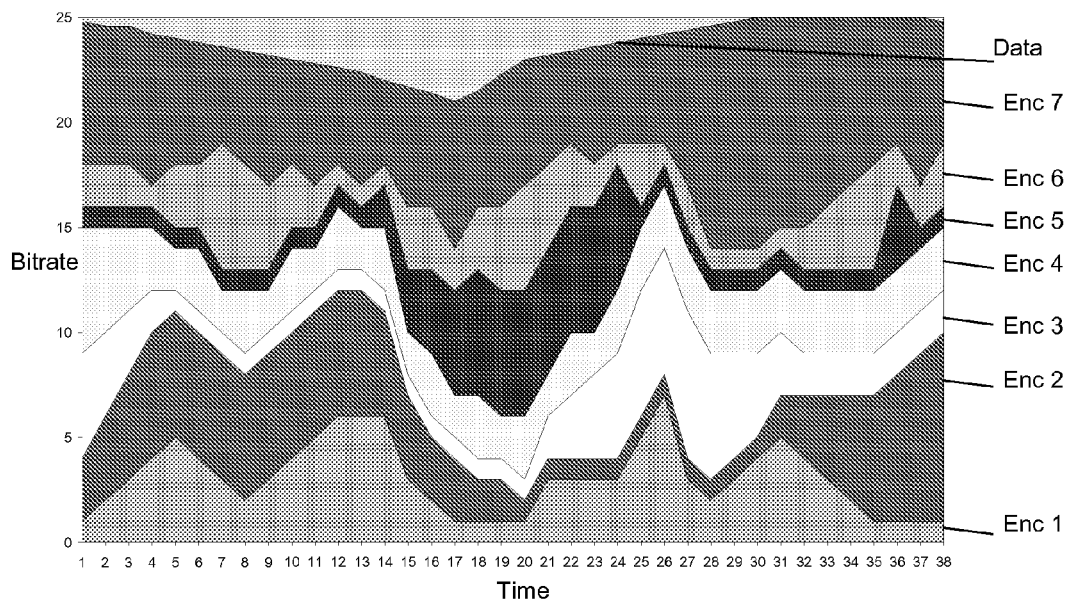
FIG. 12 shows an exemplary bit rate allocation over time made by a multiplexer controller in an exemplary statistical multiplexing system.

These principles of operation of embodiments will now be illustrated with reference to FIG. 12. FIG. 12 shows an exemplary bit rate allocation over time made by a multiplexer controller in a statistical multiplexing system, operating as described above in connection with FIGS. 3-9. In the multiplexing system of FIG. 10, the multiplexer has an input connection to an array of seven encoders (Enc 1, Enc 2, Enc 3, Enc 4, Enc 5, Enc 6 and Enc 7) and to a non-traffic data connection (data). The example bit rates are included in the diagram.

The output bit rate for this exemplary system is 25 Mbit/s. As explained above with reference to FIGS. 3-11, in embodiments of the invention all of the output bit rate of 25 Mbits may be used at all the time intervals. In time periods where no non-traffic data is present, all of the available bit rate can be allocated to the traffic data via the encoders.

Figure 10:
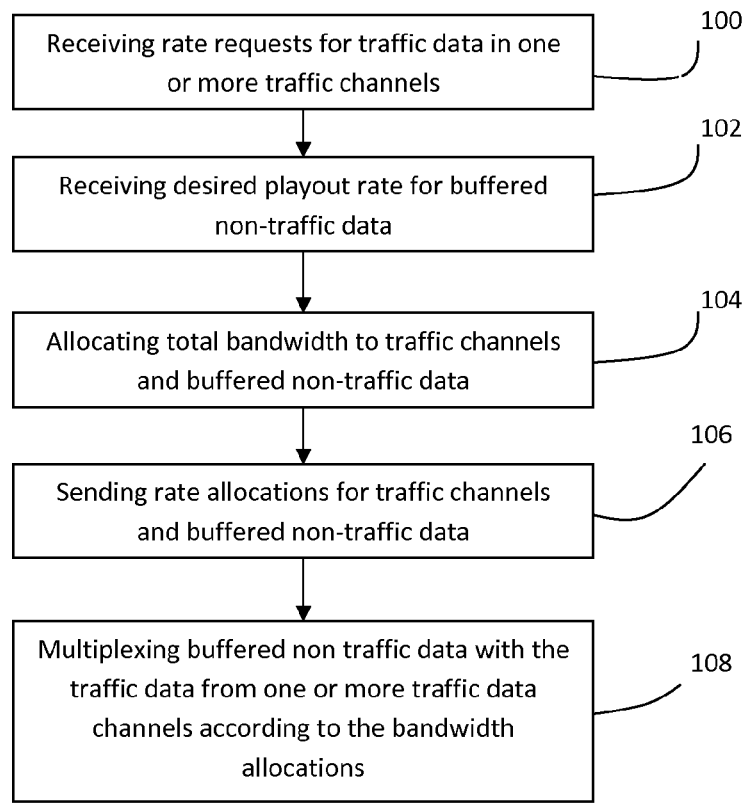
FIG. 10 is a flow chart showing a first exemplary method of operation of the multiplexer controller.
Figure 11:
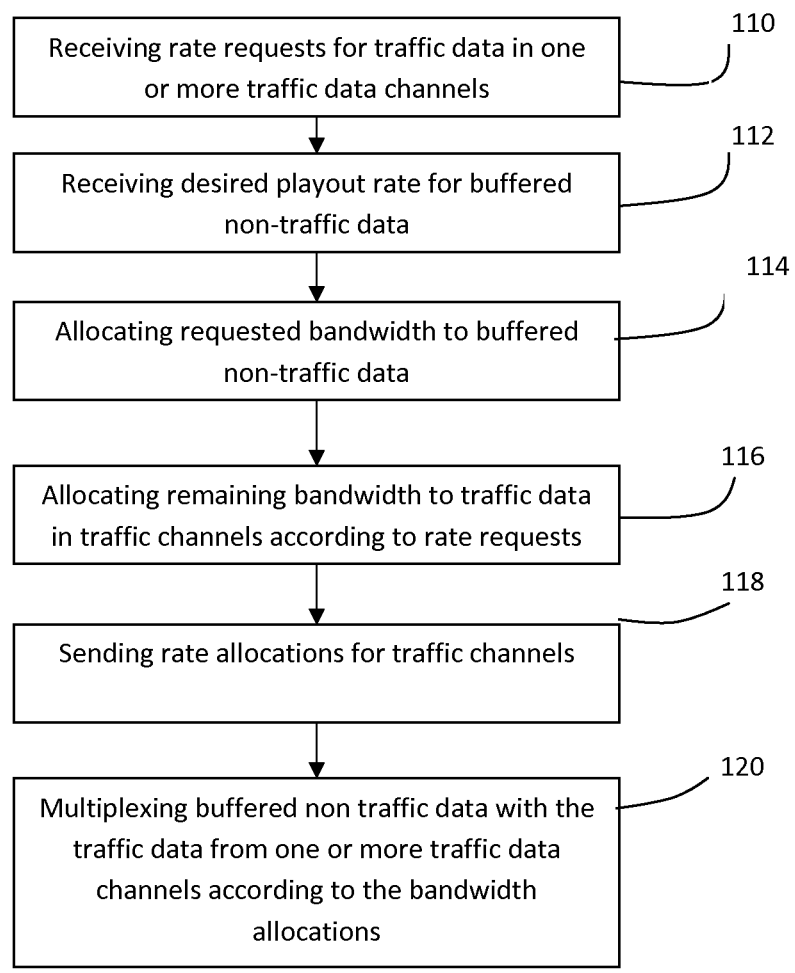
FIG. 11 is a flow chart showing a second exemplary method of operation of the multiplexer controller.

For example, at time 31 in FIG. 10, the allocated bit rates are:

Enc 1=5 Mbit/s
Enc 2=2 Mbit/s
Enc 3=3 Mbit/s
Enc 4=3 Mbit/s
Enc 5=1 Mbit/s
Enc 6=1 Mbit/s
Enc 7=10 Mbit/s
Data=0 Mbit/s
Wasted=0 Mbit/s Thus it can be seen that there is no wasted capacity in the multiplexer output and all the available bit rate is used for the traffic data and the non-traffic data.

Figure 13:
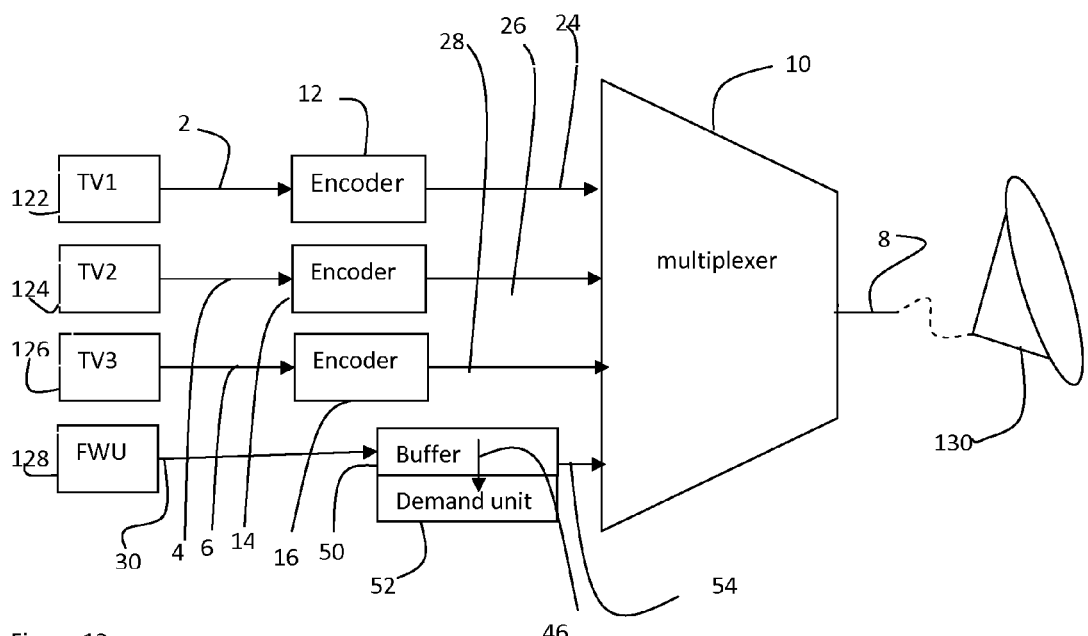
FIG. 13 illustrates an exemplary implementation of the device shown in FIG. 4 for multiplexing television data.
Figure 14:
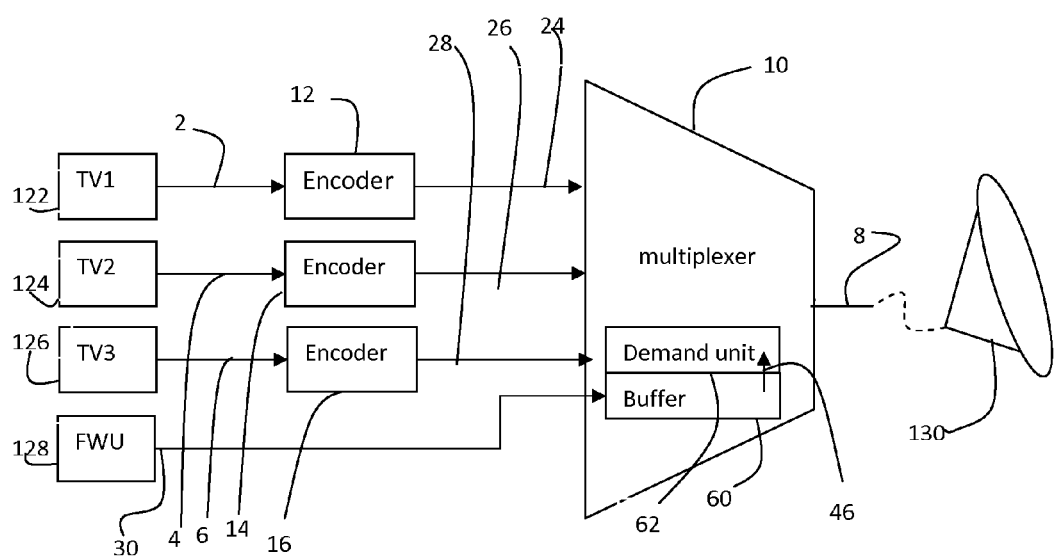
FIG. 14 illustrates an exemplary implementation of the device shown in FIG. 5 for multiplexing television data.

FIGS. 13 and 14 show the an exemplary implementation of the invention in which television data in three television data channels TV1, TV2 and TV3 are multiplexed together with firmware update data FWU to form a multiplexed channel suitable for satellite broadcast. Clearly, in actual implementations the number of channels to be multiplexed is not limited to three.

The exemplary embodiments shown in FIGS. 13 and 14 correspond to the embodiments shown in FIGS. 4 and 5, and the same reference numerals have been use for the same parts. The internal detail of the multiplexer 10 and the encoders 12, 14, 16, and the communication paths between the encoders 12, 14, 16 and the multiplexer 10, and between the demand unit 52 and the multiplexer 10 have been omitted in FIGS. 13 and 14 for clarity. Other elements of the multiplexing arrangement and the satellite broadcast chain have also been omitted for clarity.

A source of television data for a television data channel TV1 122 is coupled to encoder 12 to supply the television data for a television data channel TV 1 to the encoder 12 as an input traffic data signal 2. A source of television data for a television data channel TV2 124 is coupled to encoder 14 to supply the television data for a television data channel TV2 to the encoder 14 as an input traffic data signal 4. A source of television data for a television data channel TV3 126 is coupled to encoder 16 to supply the television data for a television data channel TV3 to the encoder 16 as an input traffic data signal 6. A source of firmware update data FWU 128 is coupled to the buffer 50, 60 to supply the firmware update data FWU to the buffer as a non-traffic data. The multiplexed output channel 8 is coupled to a satellite dish 130 to transmit the multiplexed output channel 8. The sources of television data 122, 124, 126 may be a live feed of television data, or may be stored television data, as seems appropriate to a skilled person.

In the implementation shown in FIGS. 13 and 14 television data for television data channels TV1, TV2 and TV3 are compression coded and multiplexed with each other and with buffered non-television data, such as the firmware update data FWU, to form the output multiplexed signal 8.

Thus it can be seen that in embodiments of the invention non-traffic data for multiplexing is buffered and then read out again for multiplexing at a rate which is a function of buffer fullness. The non-traffic data may be multiplexed with at least one traffic data channel. The multiplexer can view the non-traffic data channel as another multiplexing input and can allocate the available bit rate between the traffic data channels and the non-traffic data accordingly.

The latency of the non-traffic data is not controlled in the exemplary embodiments and so the time spent in the buffer will depend upon the bit rate over time. In many embodiments the timing of the non-television data is not critical, and these arrangements are satisfactory. If the non-traffic data must be delivered within a specific time period, the output bit rate from the buffer may be adjusted in order to achieve this, as will be apparent to a skilled person.

In embodiments of the invention, the desired output bit rate for the non-traffic data is linked to the average input bit rate via the buffer fullness measure. The request for bit rate for the non-traffic data can be included in the statistical multiplexing control calculation alongside the requests from the encoders for bit rate. Then the non-traffic data bit rate can also be adjusted to maintain the video encoding quality. Thus, the non-traffic data bit rate would decrease when the video content across the system requires more bits to maintain the quality and conversely, the non-traffic data bit rate would increase when the video content across the system require less bits. Embodiments allow the maximum bit rate for the data to be increased as the maximum bit rate would only be reached when the video content does not require many bits to encode so it would not impact encoding quality.

Embodiments of the invention described herein may be implemented in different ways in hardware or software in different embodiments, as will be apparent to a skilled person, and the invention is not limited to the implementation described in the exemplary embodiments. For a new system, the buffer for the non-traffic data could be integrated into the multiplexer. For a current system, a separate unit could be developed that would have an interface to the multiplexer identical to that of an encoder so that no change is required in the multiplexer to handle the new method.

The invention claimed is:

1. A method for buffering of non-traffic data for a multiplexer arranged for multiplexing the non-traffic data with at least one traffic data channel, comprising the steps of:
   storing received non-traffic data in a buffer;
   determining a desired playout rate for non-traffic data in the buffer based on buffer fullness and based on a previous playout rate associated with previously transmitted non-traffic data;
   requesting the desired playout rate for playout of the non-traffic data;
   receiving, in response to the request for the desired playout rate, a non-traffic playout rate for playout of the non-traffic data; and
   reading non-traffic data out of the buffer at the non-traffic playout rate for multiplexing with the at least one traffic data channel.

2. The method as claimed in claim 1, in which the at least one traffic data channel is a television data traffic channel.

3. The method as claimed in claim 1 further comprising the step of determining the desired playout rate for non-traffic data in the buffer as a linear function of a buffer fullness measure.

4. The method as claimed in claim 1 further comprising the steps of:
   identifying, based on a buffer fullness measure, an increase in fullness of the buffer; comparing the buffer fullness measure to a maximum playout rate threshold ($T_{max}$); and increasing a maximum desired playout rate upon determining the buffer fullness measure is less than the maximum playout rate threshold ($T_{max}$).

5. The method as claimed in claim 1 further comprising the step of supplying a rate request corresponding to the desired playout rate to a multiplex controller controlling the multiplexing operation.

6. The method as claimed in claim 5 wherein the non-traffic playout rate is received from the multiplex controller controlling the multiplexing operation.

7. The method as claimed in claim 1 further comprising the step of informing a multiplexer controller of an overflow condition of the buffer.

8. A method of multiplexing non-traffic data with at least one traffic data channel comprising the steps of:
   buffering non-traffic data as claimed in claim 5;
   receiving a rate request for traffic data in one or more traffic data channel;
   allocating an available bit rate to traffic data in each traffic data channel and allocating the non-traffic playout rate to the non-traffic data channel based on the received rate requests and the desired playout rate; and
   multiplexing the non-traffic data read out from the buffer with the traffic data from one or more traffic data channels according to the bit rate allocation.

9. The method of multiplexing as claimed in claim 8, where the step of allocating the available bit rate comprises the steps of:
   allocating the desired playout rate for buffered non-traffic data; and
   allocating the remaining bit rate to traffic data in traffic channels according to the received rate requests.

10. Device for buffering of non-traffic data, for a multiplexer arranged for multiplexing the non-traffic data with traffic data in one or more traffic channels, comprising:
    a buffer for receiving and storing the non-traffic data, and coupled for supplying the stored non-traffic data for multiplexing with the at least one traffic data channel; and
    a demand unit for:
       determining a desired playout rate for non-traffic data in the buffer based on buffer fullness and based on a previous playout rate associated with previously transmitted non-traffic data;
       requesting the desired playout rate for playout of the non-traffic data;
       receiving, in response to the request for the desired playout rate, a non-traffic playout rate for playout of the non-traffic data; and
       causing non-traffic data to be read out at the non-traffic playout rate for multiplexing with the at least one traffic data channel.

11. The device as claimed in claim 10 wherein the demand unit is coupled to the buffer to receive a buffer fullness measure from the buffer and the demand unit being operable to determine the desired playout rate as a linear function of the buffer fullness measure.

12. The device as claimed in claim 10 wherein the demand unit is coupled to the buffer to receive a buffer fullness measure from the buffer and the demand unit is further operable to:
    identify, based on the buffer fullness measure, an increase in fullness of the buffer;
    compare the buffer fullness measure to a maximum playout rate threshold($T_{max}$); and
    increase a maximum desired playout rate upon determining the buffer fullness measure is less than the maximum playout rate threshold ($T_{max}$).

13. The device as claimed in claim 10 wherein the demand unit is coupled to a multiplex controller controlling the multiplex operation of a multiplexer and is operable to send a rate request, corresponding to the desired playout rate to the multiplexer.

14. The device as claimed in claim 13 wherein the demand unit is coupled to the multiplex controller controlling the multiplex operation and is operable to receive the non-traffic playout rate from the multiplex controller.

15. A multiplexer arrangement for multiplexing non-traffic data with traffic data in one or more traffic channels comprising:
    a device for buffering of non-traffic data, as claimed in claim 10; and
    a multiplex controller operable to receive rate requests for traffic data in one or more traffic data channels; and coupled to the demand unit and operable to receive therefrom the desired playout rate for the non-traffic data;
    the multiplex controller being operable to allocate an available bit rate to each traffic data channel and to the non-traffic data based on the received rate requests and the desired playout rate received from the demand unit; and
    the multiplex controller being operable to multiplex the non-traffic data read out from the buffer at the non-traffic playout rate with the traffic data from one or more traffic data channels according to the bit rate allocation.

16. The multiplexer arrangement as claimed in claim 15 wherein the multiplex controller is coupled to the demand unit, and is operable to send the non-traffic playout rate allocated to the non-traffic data to the demand unit.

* * * * *